United States Patent [19]

Konno et al.

[11] 4,129,306
[45] Dec. 12, 1978

[54] SEALING MEANS FOR TANK MIXER

[75] Inventors: Daisuke Konno, Yokohama; Tetsuo Tanaka, Machida, both of Japan

[73] Assignee: Ebara Corporation, Tokyo, Japan

[21] Appl. No.: 852,495

[22] Filed: Nov. 17, 1977

[30] Foreign Application Priority Data

Nov. 29, 1976 [JP] Japan ............................ 51-158510[U]

[51] Int. Cl.² ............................................. F16J 15/24
[52] U.S. Cl. ..................................... 277/30; 277/165; 285/261
[58] Field of Search ............... 277/3, 4, 12, 27, 30, 277/31, 58, 165, 177, 186, 189, 193, 212 FB, 214; 285/261, 271; 251/174; 366/279; 239/142, 588

[56] References Cited

U.S. PATENT DOCUMENTS

| 406,561 | 7/1889 | Buchanan | 285/271 |
| 1,437,372 | 11/1922 | Walters | 277/30 X |
| 3,282,558 | 11/1966 | Swain | 251/174 |

FOREIGN PATENT DOCUMENTS

| 249400 | 2/1964 | Australia | 277/165 |
| 1431467 | 1/1966 | France | 277/165 |
| 4321010 | 5/1968 | Japan. | |
| 107243 | 6/1917 | United Kingdom | 285/261 |

OTHER PUBLICATIONS

"The Piping Engineering," vol. 18, No. 5, Apr. 1976, pp. 7, front cover and 102–109, (Japanese periodical).

Primary Examiner—Robert S. Ward, Jr.
Attorney, Agent, or Firm—Oblon, Fisher, Spivak, McClelland & Maier

[57] ABSTRACT

A sealing means is disclosed which comprises a support member provided with a groove adapted to receive an annular seal therein which mates with the outer spherical surface of a swivel ball of a tank mixer upon installation thereof. The groove is positioned so that it is disposed between the diametrical section of the ball taken substantially parallel to the tank wall and the tank wall and that the internal pressure of the liquid in the tank urges the seal towards the diametrical section of the ball.

9 Claims, 3 Drawing Figures

SEALING MEANS FOR TANK MIXER

FIELD OF THE INVENTION

The present invention is related to a sealing means and particularly to a sealing means employed around a member which is preferably a ball shape so that the member is given freedom of rotation about at least one axis of the ball shape.

BACKGROUND OF THE INVENTION

Agitation of liquid such as oil reserved in a tank is considered necessary for preventing sedimentation of sludge and for maintaining uniformity of blending and/or the temperature of the liquid. To such end, it is customary to use one or more tank mixers in the liquid reserving tank. Such tank mixer conventionally comprises an impeller to be disposed within the tank, a horizontal shaft extending through the wall of the tank and adapted to mount the impeller at the tip thereof, a motor for rotating the shaft and a reduction gear disposed between the motor and the shaft. In a large oil tank, the diameter of which might be several scores of meters, three tank mixers might be installed. In such case, if the tank mixers are installed stationarily, the flow of the liquid induced by the rotation of the impellers is maintained steadily in its direction and some part of the liquid contained in that tank may not be subjected to agitation. Generally, in order to avoid creation of such unagitated portion, the direction of each impeller axis is changed by pivoting each of the mixers as a whole. Such pivotal movement of the tank mixers is usually not effected so frequently, say once a week; however, such pivotal movement of the tank mixers requires special sealing means at the place where the shafts extend through the wall of the tank. For such purpose, a ball shaped member has been affixed to a hollow sleeve inside of which the impeller shaft is rotatably mounted and the ball shaped member together with the hollow tube and the tank mixer are mounted on the wall by a hinge means so as to allow pivotal movement of the tank mixer. When a sealing means is disposed so as to seal the surface of the ball shaped member, this sealing means enables to seal the portion of the wall where the hollow tube extends through the wall of the tank while permitting the pivotal movement of the tank mixer provided that the center of the ball shaped member is on the pivoting axis.

The sealing means described above conventionally uses an annular gland packing surrounding the surface of the ball at the peripheral portion thereof coinciding with the section passing the center of the ball member or at one side of that section member remote from the wall of the tank and this gland packing has been tightened in place by a packing support or backing member.

However, with such conventional sealing means as explained above it is rather difficult to obtain good sealing effect due to the spherical shape of the ball member and the seal often leaks. If the liquid contained in the tank is fresh water, the leakage might not cause serious problem; however, if the liquid is oil, the leakage results in not only an economic loss but also may cause serious problems such as a fire or environmental pollution.

Also, to replace the conventional gland packing it is necessary to first empty the tank. Therefore, it has been long desired to have an effective seal at the wall of the tank without the drawbacks of the prior art.

SUMMARY OF THE INVENTION

Accordingly, it is an object of this invention to provide a novel sealing means used in installing a tank mixer in a tank in which the gland packing may be replaced without emptying the tank.

A further object of this invention is to improve the sealing effect of a sealing means used in installing a tank mixer while enabling pivotal movement of the tank mixer.

According to the present invention, a novel sealing means is provided wherein a ball shaped member is used in conjunction with a tank mixer and the wall of a storage tank is effectively sealed by an annular seal member which contacts the outer surface of the ball member at a portion between the tank and the diametrical section of the ball member. The term "diametrical section", employed throughout the specification and the appended claims, refers to a sectional plane parpendicularly intersecting the axis of the impeller shaft and passing the center of the ball. The pressure of the liquid contained within the tank effectively acts on the seal member to enhance the sealing effect of the annular seal.

The further advantages and objects of this invention will be clarified when the description of the preferred embodiment is referenced which follows the brief explanation of the drawings summarized below.

DETAILED EXPLANATION OF THE PREFERRED EMBODIMENTS

Figure 1:
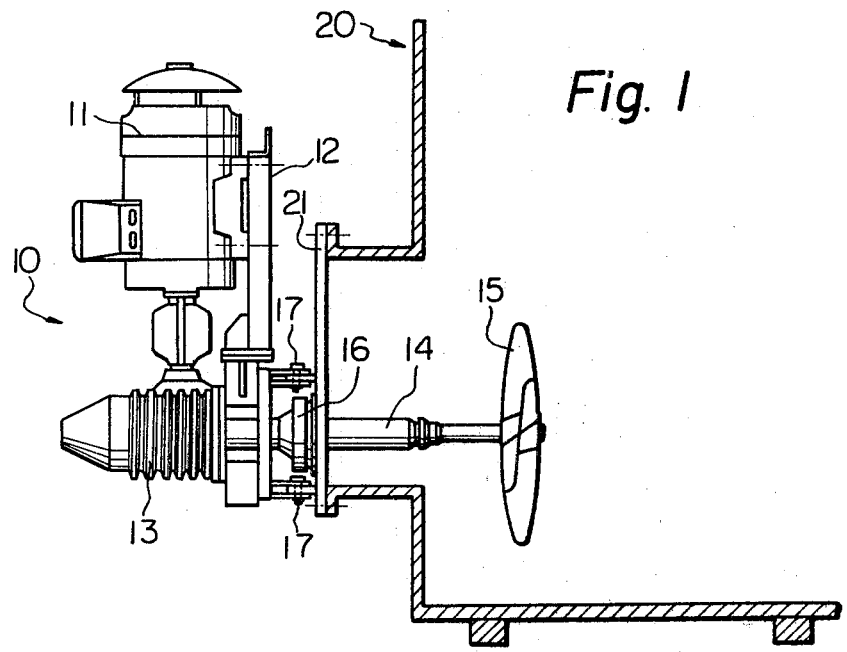
FIG. 1 is a schematic illustration showing a tank mixer mounted on a tank.

Referring to FIG. 1, there is shown a schematic view showing a tank mixer 10 mounted on a tank 20. The tank mixer 10 comprises a motor 11 vertically supported on a motor base 12, a reduction mechanism 13, a shaft assembly 14 including an impeller shaft, and an impeller 15 mounted at the end of the impeller shaft. The reduction mechanism 13 preferably comprises a worm and a worm wheel and converts the rotation of the vertical motor shaft to the rotation of the horizontal impeller shaft. However, other types of reduction mechanism may also be used. The tank mixer 10 is also provided with a swivel ball section 16 and is mounted on a tank flange 21 by means of a pivot pins 17, 17, the axis of the pivot pins being arranged to coincide with the center of a ball shaped member of the ball section 16 which is adapted to serve as a sealing means at the border between the outside and the inside of the tank as well as to allow pivotal movement of the tank mixer 10 about the axis of the pins 17, 17.

Since the ball section 16 is an essential feature of this invention, further explanation will be directed to this section.

Figure 2:
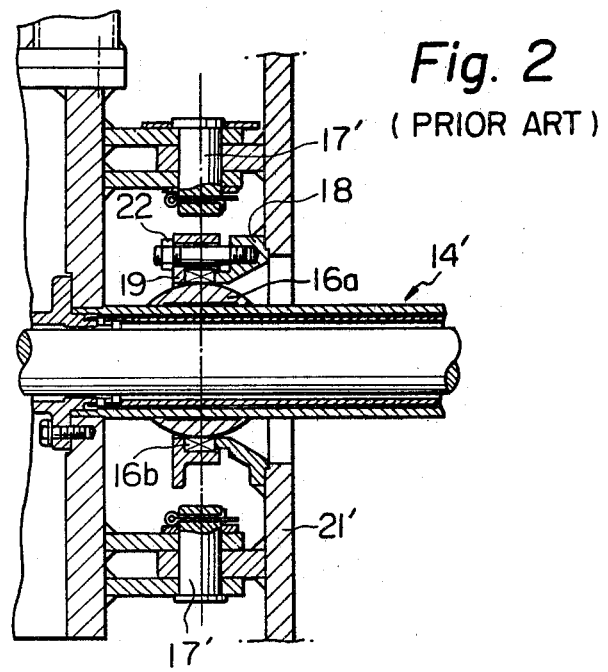
FIG. 2 shows a prior art sealing means around a ball shaped member of a tank mixer.

Referring to FIG. 2, there is shown a portion of a ball section of prior art.

On a tank flange 21', a sealing flange 18 is mounted so as to support a ball shaped member 16a to which a shaft assembly 14' is coupled. The shaft assembly 14' extends through an opening provide in the flange 21' and the support flange 18 is adapted to cover the opening in the flange 14'. The tank mixer is mounted on the flange 14' by means of pins 17', 17' so that the tank mixer pivots about the axis established by the pins 17 and 17. In order to seal the tank at the portion of the ball-shaped member 16a, a gland packing 16b is disposed arround the peripheral surface of the member 16a at the portion corresponding to the sectional surface which passes the center of the ball-shaped member. The gland packing is secured in place by tightening a retaining member 19 against the supporting flange 18 with the gland packing 16b therebetween by means of fastening nuts 22 so that the gland packing 16b is compressed against the surface of the ball-shaped member 16a to seal the tank at its contacting surface with the member 16a. By the arrangement explained above, the tank mixer or the horizontal shaft assembly 14' is pivotable about the pins 17' and 17' while maintaining the sealing effect of the tank. However, in case of failure of the gland packing 16b, the liquid contained within the tank is to be discharged for replacing the gland packing 16b, as already discussed in the background of this invention.

Figure 3:
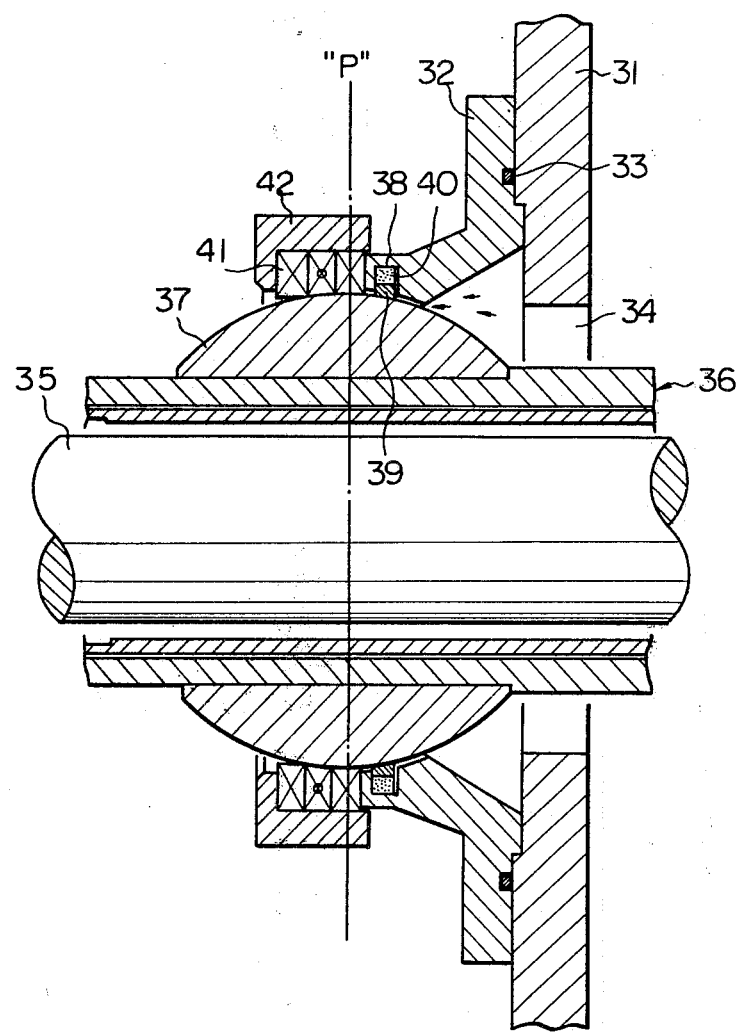
FIG. 3 shows a section of a sealing means according to the present invention.

Now, reference is made to FIG. 3 which illustrates the novel sealing structure of this invention.

On a tank flange 31, a sealing flange 32 of an annular type is mounted by suitable fastening means such as studs and nuts (not shown) so as to surround an opening 34 in the tank flange 31 with an "O"-ring 33 disposed between the flanges 31 and 32 for providing a liquid tight seal between the mating surfaces of the flanges. An impeller shaft 35 is rotatably housed within a hollow sleeve assembly 36 by a suitable bearing means (not shown). A ball-shaped member 37 has a through-hole so as to receive the hollow sleeve assembly 36 therethrough. The ball-shaped member 37 is firmly secured to the sleeve assembly 36 by any suitable means such as welding. The portion of the sealing flange opposite to that mating with the tank flange 31 is formed to extend away from the tank in such a manner that the diameter of the support gradually decreases in the extending direction so as to support the ball-shaped member 37 at an appropriate position so as to allow pivotal motion of the tank-mixer.

The outermost end of the supporting flange 32 is arranged to terminate before the imaginary plane "P" perpendicular to the axis of the shaft 35 and passing the center of the ball-shaped member 37. The inside surface at the end of the supporting flange is given a partial spherical surface corresponding to the outer spherical surface of the member 37 so as to provide swivelling freedom of the member 37 relative to the supporting flange 32. The inside surface of the flange 32 which is a part of the spherical surface is provided with an annular groove 38 within which a seal-ring 39 and an elastic ring 40 are disposed. The seal-ring 39 is preferably made of synthetic plastic material. Fluorocarbon polymers are one of the most preferable kinds of material for making the seal-ring 39. The fluorocarbon polymer "Teflon" ™ produced by Du Pont is commonly used since its friction coefficient is relatively low thereby making it easy for the tank mixer to pivot. The elastic ring 40 is made of rubber, coiled spring, etc. and adapted to urge the seal-ring 39 onto the surface of the ball-shaped member 37 so as to establish sealing effect at the contacting surface therebetween. To such end, the seal-ring 39 is devised to have an original inner diameter smaller than the diameter of the ball shaped member at the portion thereof where the contact is expected, thereby providing good sealing effect at installation of the tank mixer. The width of the groove 38 may be made equal to those of the seal-ring 39 and the elastic ring 40; however, in order to accommodate the increasing width of these rings under compression, it is preferable to make the width of groove 38 larger than that of the seal-ring 39 and the elastic ring 40. Also, it is preferable to make the bottom or outer diameter of the groove 38 compatible with the outer diameter of the elastic ring 40 so that effective compression of the seal-ring 39 is expected.

In addition to the seal-ring 39, a gland packing or gland packings 41 are disposed around the outer spherical surface of the ball-shaped member 37 at the left portion of the end of the supporting flange 32, as viewed in FIG. 3, by means of a retainer 42 which is coupled to the supporting flange 32 by any suitable fastening means.

The construction of the sealing means explained above referring to FIG. 3 realizes further advantages. The location of the groove 38 is arranged to be between the plane "P" and the tank flange 31 which means that the seal-ring 39 is positioned at the tank side relative to the diametrical section of the ball-shaped member 37 where the internal pressure of the tank is applied thereon. Also, at the time of installation, the diameter of the seal-ring 39 is forcibly enlarged. Therefore, the seal-ring 39 is placed under the self shrinking tendency which is enhanced by the elastic ring 40 and also the pressure of the liquid in the tank urges the seal ring towards the plane "P". These conditions touched upon above ensure the satisfactory sealing effect at the ball-shaped member portion.

Also, the galnd packing or packings may be replaced without need of emptying the tank.

The present invention has been explained in detail referring to the preferred embodiment; however, it should be noted that modification and changes are readily available to those skilled in the art without departing from the spirit and scope of this invention which is defined in the appended claims.

What is claimed is:

1. A sealing means for use with a swivel ball member disposed adjacent the wall of a tank adapted to contain liquid comprising:
    an annular sealing element, the inner diameter of which is smaller than the diameter of said ball member; and
    a supporting member for supporting said ball member to allow swivelling movement thereof, said supporting member being provided with an annular groove for receiving said element therein, the position of said groove being arranged closer to the tank than the diametrical section of the ball member.

2. A sealing means as claimed in claim 1 wherein said element comprises an annular seal ring and an elastic ring adapted to urge said seal ring onto the outer surface of said ball member.

3. A sealing means as claimed in claim 2 wherein said seal ring is made of synthetic plastic material having low frictional coefficient.

4. A sealing means as claimed in claim 1 wherein the width of said groove is made larger than that of said element.

5. A sealing means adapted for use with a tank mixer having a swivel ball through which the impeller shaft of the mixer thereof extends, said shaft being adapted to extend through the wall of a tank containing liquid and provided with an impeller at the tip thereof so as to be located inside the tank, said sealing means comprising:
- an annular sealing element having an inner diameter smaller than that of said ball; and
- a support member for supporting the swivel ball so as to allow swivelling motion thereof at the portion adjacent the tank wall where said shaft extends therethrough, said supporting member being provided with an annular groove in a position closer to the tank than the diametrical section of the ball where the internal pressure of the liquid is effective.

6. A sealing means as claimed in claim 5 wherein said element comprises an annular seal ring and an elastic ring adapted to urge said seal ring onto the outer surface of said ball.

7. A sealing means as claimed in claim 6 wherein said seal ring is made of synthetic plastic material having low frictional coefficient.

8. A sealing means as claimed in claim 5 wherein the width of said groove is made larger than that of said element.

9. A sealing means as claimed in claim 5 wherein said tank mixer is pivotably mounted on the wall of said tank so that the axis of pivoting motion coincides with the center of said swivel ball, a gland packing being disposed together with a retainer therefor so as to seal the surface of the ball at the place adjacent said annular element but remote from said wall compared to that of said element.

* * * * *